Jan. 24, 1928.
A. BABL
FLYTRAP
Filed March 30, 1927
1,656,969
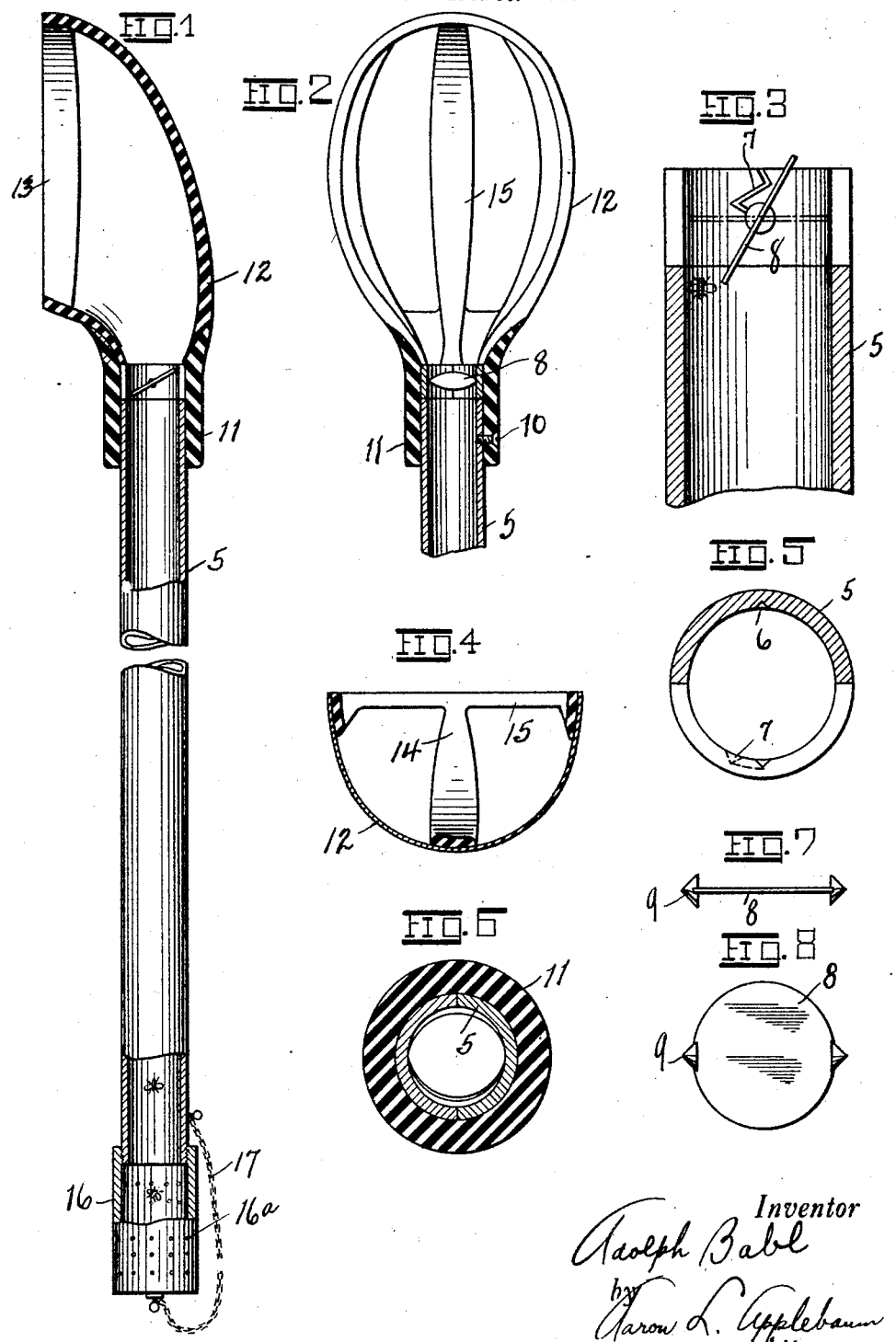
Inventor
Adolph Babl
by
Aaron L. Applebaum
Attorney Patented Jan. 24, 1928.

1,656,969

UNITED STATES PATENT OFFICE.

ADOLPH BABL, OF NEW YORK, N. Y.

FLYTRAP.

Application filed March 30, 1927. Serial No. 179,626.

This invention relates to fly or insect traps and more particularly to that class of hand devices whereby the trapped fly or insect may be blown into a suitable receptacle in the bottom of the handle.

One of the objects of my invention is to provide a fly or insect trap provided with a resilient funnel shaped head adapted to encompass the fly or insect and create sufficient suction to draw the trapped object into the manipulating handle and a receptacle or container.

Another object of my invention is to provide a hand manipulated fly or insect trap whereby the object may be trapped without marring or soiling the wall or furniture.

With the above objects in view and others which will be suggested and best understood when taken in connection with the accompanying drawings, Fig. 1 is a view, partly in section showing my invention.

Fig. 2 is a front view of the resilient head on the upper end of the tube or handle.

Fig. 3 is an enlarged sectional view showing the gate or door at the entrance to the tube or handle.

Fig. 4 is a sectional view showing the resilient head and the spider.

Fig. 5 is a detail sectional view showing the door mounting or support.

Fig. 6 is a sectional view through the connection between the tube and funnel head.

Fig. 7 is a side view of the gate or door.

Fig. 8 is a plan view of the gate or door.

Referring now to the drawings wherein like reference characters designate corresponding parts throughout the several views, 5 designates a tubular handle provided adjacent its upper end with a notch 6 and a diagonally disposed Z-shaped slot 7. A circular gate or door 8 provided with opposed cone-shaped bearings 9 which are adapted to register with the notch 6 and in the bottom of the slot 7 for pivotal movement to open and close the passage to the interior of the handle.

Fastened to the top of the handle by means of a screw 10 or other fastening element, is the sleeve portion 11 of a funnel shaped or semi-circular resilient head 12 preferably of thin rubber and having an enlarged entrance opening 13. The head is equipped with a spider 14, the arms 15 of which are connected to the interior of said head and are preferably of thicker rubber. The impact of the head against a wall or article of furniture will thus cause the spider to flex and produce sufficient suction within the head to blow or draw the fly or insect toward the gate or valve which is capable of movement from its closed or dotted line position to the open full line position as shown by Fig. 3 of the drawings.

On the bottom of the tube or handle, I provide a cup, receptacle or container 16 having openings 16ª and threaded to said handle and connected thereto by a flexible chain 17 whereby said container may be removed from time to time so as to remove its contents.

It will be noted that the diameter of the entrance of the funnel is of such width that when the handle is manipulated, it may encompass the fly or insect and that the escape of the trapped air within the funnel will cause the object to be drawn into the handle and container in the bottom thereof. The gate or door being pivoted as shown will open from the dotted line to the full line position by reason of the escape of the trapped air which when released permits the door to return to its initial closed position and prevents the fly or insect from returning to the entrance opening.

Having shown and described my invention what I claim as new and desire to secure by Letters Patent is:—

1. A trap of the class described comprising a tubular handle, a resilient funnel shaped head having a spider on the interior thereof, said head being connected to one end of the handle and provided with an enlarged entrance opening, a pivoted gate at the entrance to the handle and a detachably connected container at the opposite end of the hande.

2. A trap of the class described comprising a tubular handle, a resilient funnel shaped head having a spider of thicker material connected thereto and on the interior thereof whereby the said head may be partially contracted to trap the air therein, said head having an enlarged entrance opening and a sleeve for connection to said handle, a pivoted gate in the handle and a detachably connected container at the opposite end of the handle.

In testimony whereof I affix my signature.

ADOLPH BABL.